US011824894B2

(12) United States Patent
Simioni et al.

(10) Patent No.: US 11,824,894 B2
(45) Date of Patent: Nov. 21, 2023

(54) DEFENSE OF TARGETED DATABASE ATTACKS THROUGH DYNAMIC HONEYPOT DATABASE RESPONSE GENERATION

(71) Applicant: International Business Machines Corporation, Armonk, NY (US)

(72) Inventors: Marco Simioni, Dublin (IE); Stefano Braghin, Dublin (IE); Killian Levacher, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 53 days.

(21) Appl. No.: 17/104,013

(22) Filed: Nov. 25, 2020

(65) Prior Publication Data
US 2022/0166795 A1    May 26, 2022

(51) Int. Cl.
*H04L 9/40* (2022.01)
*G06F 21/55* (2013.01)
*G06F 21/62* (2013.01)

(52) U.S. Cl.
CPC ........ *H04L 63/1491* (2013.01); *G06F 21/552* (2013.01); *G06F 21/6227* (2013.01); *G06F 21/6254* (2013.01)

(58) Field of Classification Search
CPC .............. G06F 21/552; G06F 21/6227; G06F 21/6254; H04L 63/1491
See application file for complete search history.

(56) References Cited

U.S. PATENT DOCUMENTS

| 7,694,339 | B2 | 4/2010 | Blake et al. |
| 8,650,215 | B2 | 2/2014 | Little |
| 9,565,202 | B1 | 2/2017 | Kindlund |
| 9,602,536 | B1 | 3/2017 | Brown, Jr. |
| 9,716,727 | B1 | 7/2017 | Seger |
| 9,882,929 | B1 | 1/2018 | Ettema et al. |

(Continued)

FOREIGN PATENT DOCUMENTS

| CN | 103051615 B | 4/2013 |
| CN | 108199871 A | 6/2018 |

(Continued)

OTHER PUBLICATIONS

Lili Mou, Yiping Song, Rui Yan, Ge Li, Lu Zhang, Zhi Jin1; Sequence to Backward and Forward Sequences: a Content-Introducing Approach to Generative Short-Text Conversation; (Year: 2016).*

(Continued)

*Primary Examiner* — Luu T Pham
*Assistant Examiner* — Chao Wang
(74) *Attorney, Agent, or Firm* — CANTOR COLBURN LLP; Kurt Goudy

(57) ABSTRACT

Embodiments of the invention are directed to techniques that include receiving a query intended for a targeted database and determining that the query is from an unauthorized user. A response is returned to the unauthorized user generated by a model, the response being dynamically generated to fulfill the query. The model is configured to generate responses consistent with any previous responses returned to the unauthorized user.

12 Claims, 9 Drawing Sheets

(56) References Cited

U.S. PATENT DOCUMENTS

| | | | |
|---|---|---|---|
| 2004/0166832 A1* | 8/2004 | Portman | G06Q 30/02 |
| | | | 704/E15.047 |
| 2011/0214182 A1 | 9/2011 | Adams | |
| 2017/0134405 A1 | 5/2017 | Ali et al. | |
| 2017/0149825 A1 | 5/2017 | Gukal | |
| 2017/0230336 A1 | 8/2017 | Bingham | |
| 2017/0331858 A1 | 11/2017 | Clark, III et al. | |
| 2017/0364794 A1 | 12/2017 | Mahkonen | |
| 2018/0103047 A1 | 4/2018 | Turgeman | |
| 2019/0058733 A1 | 2/2019 | Wright | |
| 2019/0332786 A1* | 10/2019 | Brandwine | G06F 21/554 |
| 2019/0377880 A1* | 12/2019 | Kolychev | H04L 63/1433 |
| 2020/0186567 A1 | 6/2020 | Hebert et al. | |
| 2020/0193056 A1* | 6/2020 | Hughes | G06F 16/335 |
| 2020/0285687 A1* | 9/2020 | Zhang | G06F 16/9574 |
| 2020/0364842 A1* | 11/2020 | Chaton | G06T 7/001 |
| 2020/0389469 A1 | 12/2020 | Litichever | |
| 2021/0117838 A1* | 4/2021 | Hassan | G06N 20/00 |
| 2021/0194925 A1 | 6/2021 | Xiao | |
| 2021/0312065 A1* | 10/2021 | Yang | G06F 21/44 |

FOREIGN PATENT DOCUMENTS

| | | |
|---|---|---|
| CN | 108353078 A | 7/2018 |
| CN | 108429762 A | 8/2018 |
| CN | 109246108 A | 1/2019 |
| CN | 109361670 A | 2/2019 |
| CN | 106534195 B | 10/2019 |
| CN | 110719253 A | 1/2020 |
| CN | 110995640 A | 4/2020 |
| KR | 20180115726 A | 10/2018 |

OTHER PUBLICATIONS

I. Kuwatly • M. Sraj • Z. Al Masri • H. Artail; A dynamic honeypot design for intrusion detection; The IEEE/ACS International Conference onPervasive Services, 2004. ICPS 2004. Proceedings. (pp. 95-104); (Year: 2004);.*

A.M. Resmi 108 R. Manicka Chezian; An extension of intrusion prevention, detection and response system for secure content delivery networks; 2016 IEEE International Conference on Advances in Computer Applications (ICACA) (pp. 144-149); (Year: 2016).*

Supeno Djanali • F. X. Arunanto • Baskoro Adi Pratomo • Hudan Studiawan • Satrio Gita Nugraha; SQL injection detection and prevention system with raspberry Pi honeypot cluster for trapping attacker; 2014 International Symposium on Technology Management and Emerging Technologies (pp. 163-166); (Year: 2014).*

Anonymous, "Automated Protection of Software Defined Systems," IP.com No. IPCOM000250430D, Jul. 13, 2017. 7p.

Bockermann et al., "Learning SQL for Database Intrusion Detection Using Context-Sensitive Modelling", DIMVA 2009, 8 pages.

Carteri et al., "Method and System for Dynamic Maze Honeynet with Artifical Intelligence," U.S. Appl. No. 16/869,928, filed May 8, 2020.

Garg et al., "Deception in Honeynets: a Game-Theoretic Analysis", Proceedings of the 2007 IEEE, Workshop on Information Assurance United States Military Academy, West Point, NY, Jun. 20-22, 2007, 7 pages.

Github.com, [online]; [retrieved on Nov. 9, 2020]; retrieved from the Internet: https://github.com/paralax/awesome-honeypots.

HackerNoon, [online]; [retrieved on Nov. 9, 2020]; retrieved from the Internet: https://hackernoon.com/poison-records-acra-eli5-d78250ef94f.

List of IBM Patents or Patent Applications Treated as Related; Date Filed: Dec. XX, 2020, 2 pages.

Mairh et al. "Honeypot in Network Security: a Survey", Proceedings of the 2011 International Conference of Communication, Computing & Security (ICCCS '11). 2011. 6 pages.

Pouget, "Honeypot-based Forensics", AusCERT Aisa PacificInformation Technology Security Conference. 2004. 15 p.

Provos, "A Virtual Honeypot Framework", USENIX Security Symposium. vol. 173, No. 2004. 2004. 14 pages.

International Search Report; International Application No. PCT/CN2021/129354; International Filing Date: Nov. 8, 2021; dated Feb. 8, 2021; 10 pages.

* cited by examiner

DEFENSE OF TARGETED DATABASE ATTACKS THROUGH DYNAMIC HONEYPOT DATABASE RESPONSE GENERATION

BACKGROUND

The present invention generally relates to computer systems, and more specifically, to computer-implemented methods, computer systems, and computer program products configured and arranged to defend targeted database attacks through dynamic honeypot database response generation.

Database security concerns the use of a broad range of information security controls to protect databases against compromises of their confidentiality, integrity, and availability. Database security involves various types or categories of controls, such as technical, procedural, administrative, and physical. Protecting databases includes potentially protecting the data, the database applications, stored functions, the database systems, the database servers, and the associated network links. Security risks to database systems include, for example, unauthorized or unintended activity or misuse by authorized database users or by unauthorized users. Security risks can result in, for example, inappropriate access to sensitive data, metadata, or functions within databases, or inappropriate changes to the database programs, structures, or security configurations.

SUMMARY

Embodiments of the present invention are directed to computer-implemented methods of defending against targeted database attacks through dynamic honeypot database response generation. A non-limiting example computer-implemented method includes receiving a query intended for a targeted database and determining that the query is from an unauthorized user. The computer-implemented method includes returning a response to the unauthorized user generated by a model, the response being dynamically generated to fulfill the query, the model being configured to generate responses consistent with any previous responses returned to the unauthorized user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
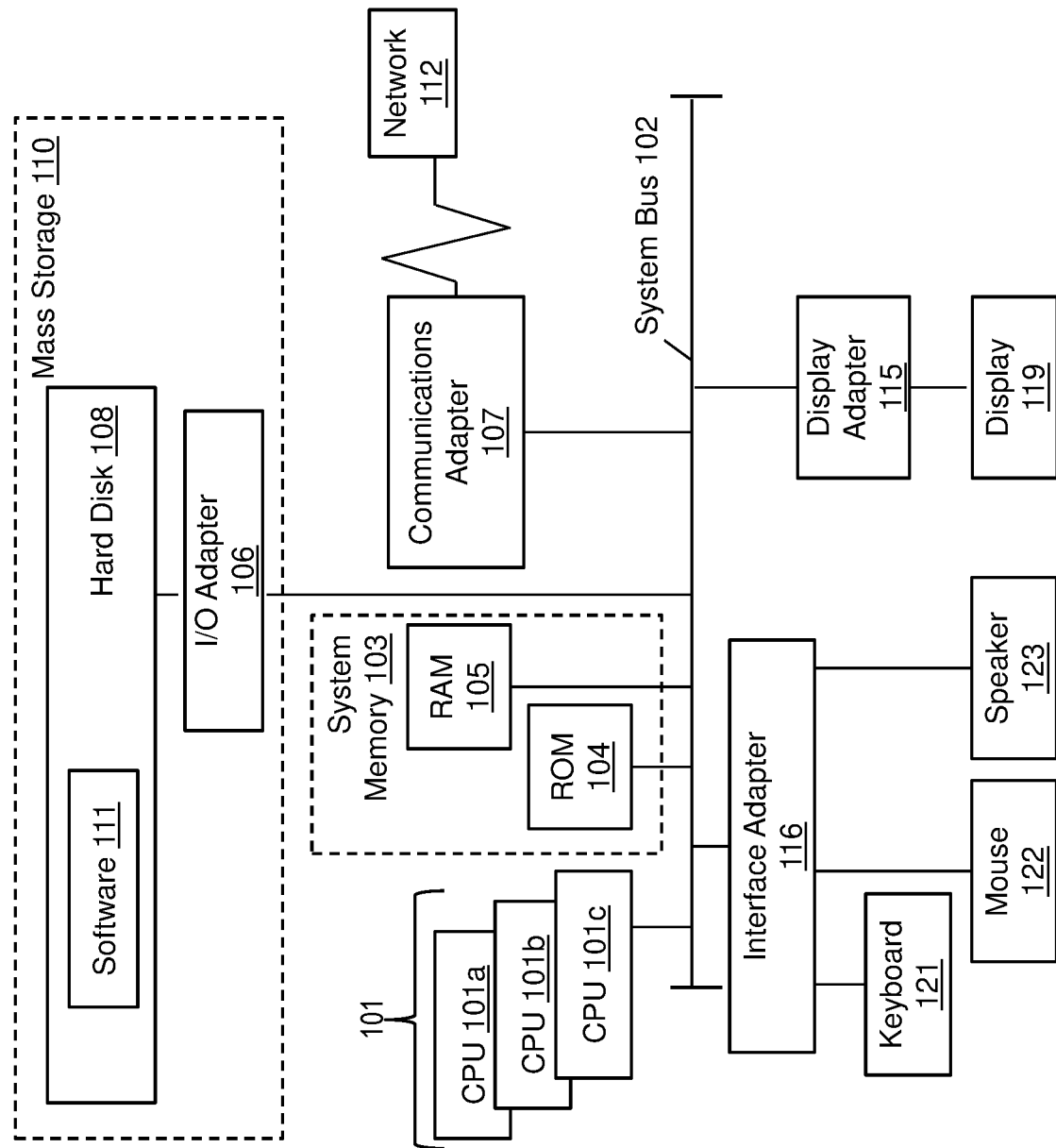
FIG. 1 depicts a block diagram of an example computer system for use in conjunction with one or more embodiments of the present invention.

One or more embodiments of the present invention provide computer-implemented methods, computer systems, and computer program products for protecting a database targeted by attackers looking to obtain the sensitive information contained in the database, wherein the computer-implemented method includes substituting targeted database responses with synthetic (honeypot) database responses. The honeypot database responses trick attackers into thinking they are retrieving valuable information from the targeted database. In reality, the actual valuable information remains safe while the attacker's attention is kept away from the actual target. This provides the Incident Response team with the opportunity to monitor the attacker's behavior.

When a corporate network or a website is breached, databases are usually a top priority target for an attacker looking to capture sensitive data such as, for example, credit card information, personal information, usernames and passwords, etc. When a system is breached, the Incident Response Team acts to minimize the damage, monitor and track the perpetrator, and understand their intention. Keeping an attacker busy on a network is an important part of an Incident Response procedure. This allows the investigator to understand the technique, the motivation, and ultimately the source of the attack and perhaps also the attacker. Honeypots, or "fake" systems, are usually deployed on a network in order to keep an attacker busy. Moreover, while the attacker's attention is focused on the fake system, his attention is kept away from "real" systems that contain the sensitive data. This ultimately gives more time and opportunity for the Incident Response team to monitor the activity of the attacker. For a skilled attacker, traditional honeypots can be easy to identify, and as soon as the attacker understands that she/he is interacting with such a honeypot system, she/he stops the attack and focuses on other systems.

This not only prevents the Incident Response team from having the opportunity to monitor and track the attacker, but it does not keep the attacker's attention away from other systems of value.

In accordance with one or more embodiments of the invention, an ideal honeypot database is indistinguishable from the targeted database system. This means that honeypot database responses returned to the attacker should be consistent with previous replies generated from the real targeted database for this attacker, before this user was detected as malicious. In other words, honeypot responses are attacker specific based on past history for the specific attacker in accordance with one or more embodiments. Moreover, the honeypot database responses are consistent not only with the previous replies generated, but also to the real database data (i.e., the data contained in these honeypot database responses resembles the data contained in the real database). One or more embodiments of the invention provide attacker specific responses, as a honeypot defense solution that is scalable and defends itself against multiple, simultaneous attackers. In other words, one or more embodiments of the invention are not required to create a honeypot database by duplicating the entire target database per attacker, which would be unrealistic. Rather, one or more embodiments of the invention are configured such that database query response time for honeypot database responses is equivalent to response time for actual responses received from the target database to avoid any suspicion by the attacker. This not only benefits the response times, but it also benefits the way the system (including the honeypot database responses) can scale according to one or more embodiments. Further, the generation of honeypot database responses does not require a database, perhaps made of terabytes of data, to be duplicated multiple times.

In accordance with one or more embodiments of the invention, a conditional generative model is provided which produces honeypot database responses on demand, based on and consistent with the past queries of the attacker, where the honeypot database responses do not contain any sensitive information while still resembling data contained in the real database. The conditional generative model makes use of a malicious query record which records and audits all malicious queries from the attacker along with honeypot database responses to the attacker. A malicious query detector is used to divert malicious queries to a honeypot database which is the conditional generative model. A data anonymization tool is used to anonymize any sensitive information. A glossary is provided below.

Incident Response: Incident response is an organized approach to addressing and managing the aftermath of a security breach or cyberattack, also known as an information technology (IT) incident, computer incident, or security incident.

Honeypot: A honeypot is a computer security mechanism set to detect, deflect, or in some manner, counteract attempts at unauthorized use of information systems.

Conditional Generative Model (GAN): A model such as a conditional GAN that learns to reproduce data similar to an original targeted data source. The conditional aspect of the generative model additionally enables this model, once it is trained, to make the output of this model vary based on specific input conditions provided to the model during prediction time, in accordance with one or more embodiments of the invention.

Sensitive Information: Sensitive information refers to any information which the owner of a database does not wish to reveal to an attacker. This of course includes personal information (such as names, addresses, etc.) but could also include non-personal information such as contract amounts, sales figures, etc.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
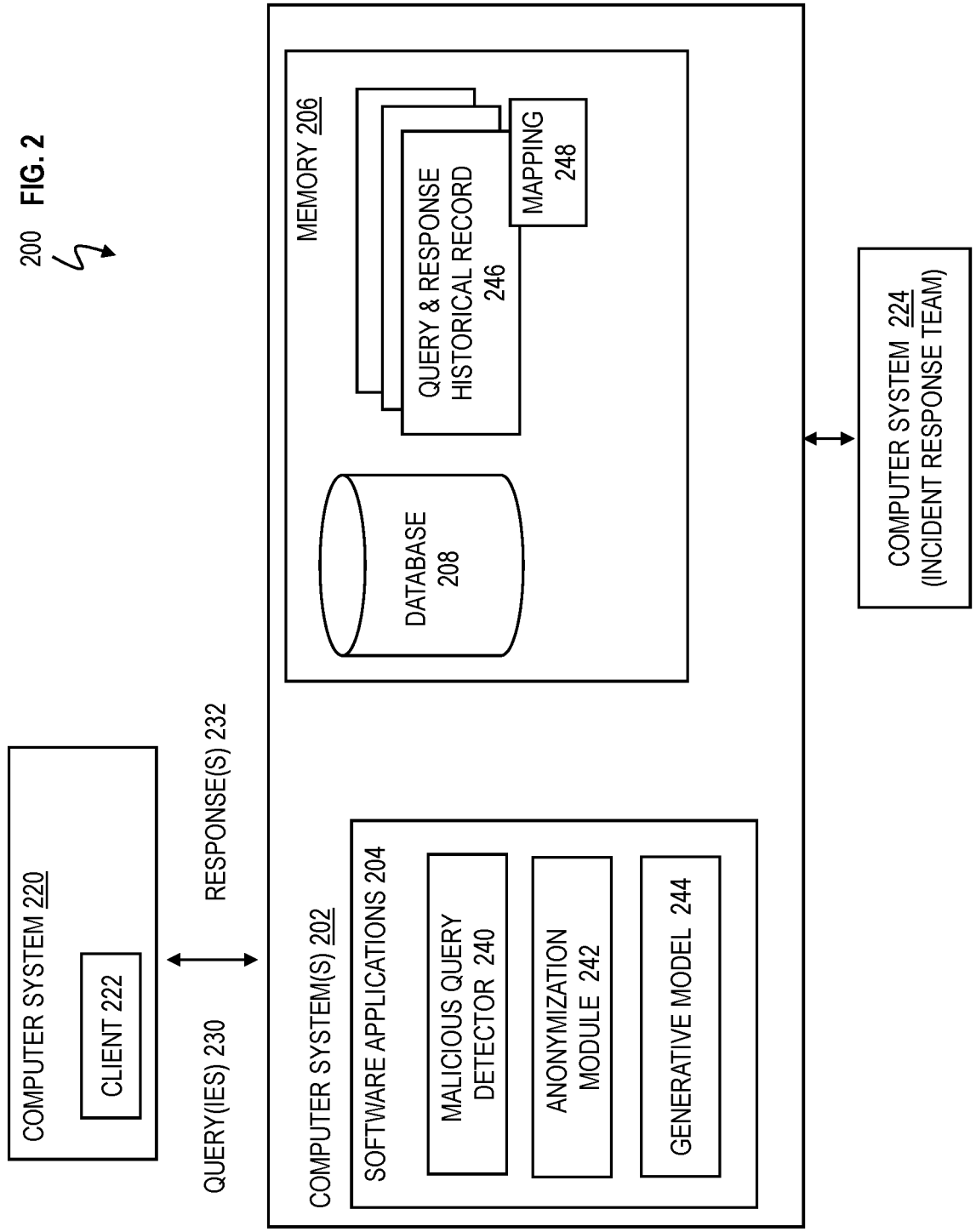
FIG. 2 depicts a block diagram of a system for defense of targeted database attacks through dynamic honeypot database response generation in accordance with one or more embodiments of the present invention.

FIG. 2 is a block diagram of a system 200 for defense of targeted database attacks through dynamic honeypot database response generation in accordance with one or more embodiments of the present invention. FIG. 2 depicts one or more computers systems 202 coupled to computer system 220 and computer system 224. Computer systems 202 can be representative of numerous computers in a datacenter servicing various users. Computer system 220 can be representative of numerous user computers/devices requesting access to resources on computer systems 202. Elements of computer system 100 can be used in and/or integrated into computers system 202, computer system 220, and computer system 224.

Figure 3:
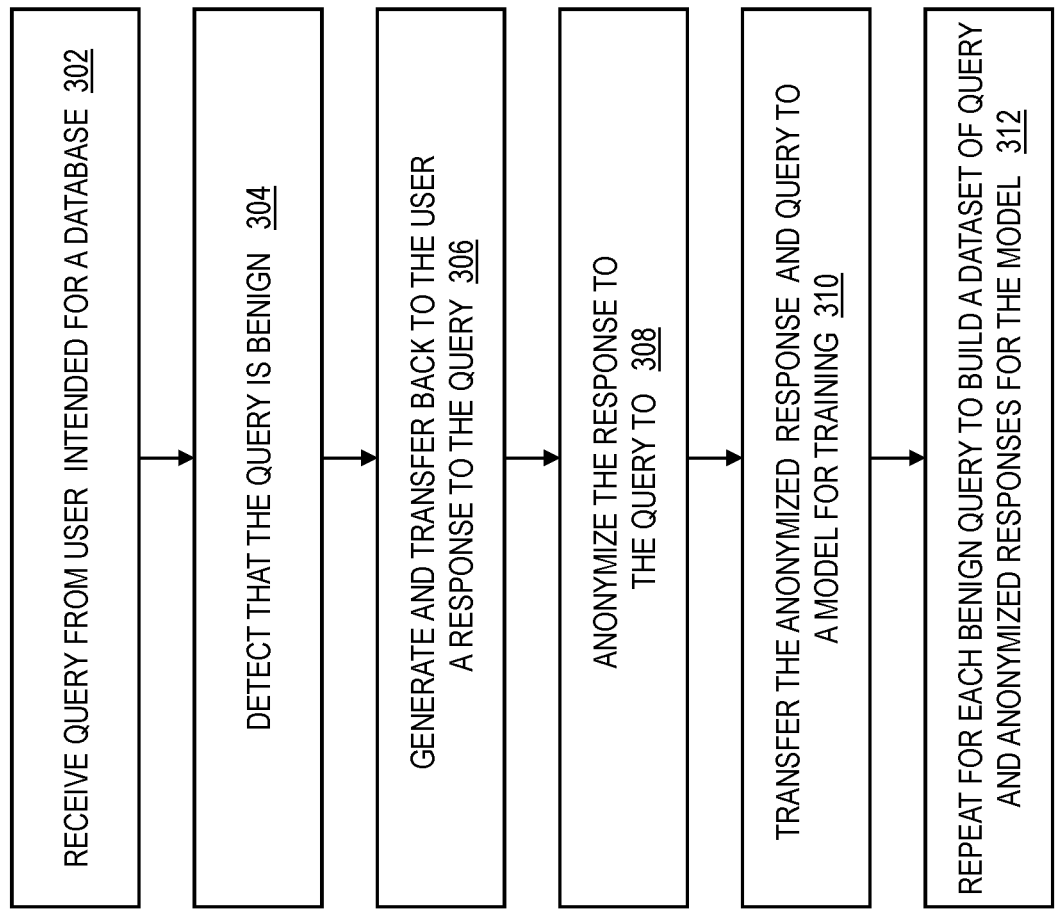
FIG. 3 depicts a flowchart of a computer-implemented process for defense of targeted database attacks through dynamic honeypot database response generation in accordance with one or more embodiments of the present invention.
Figure 4:
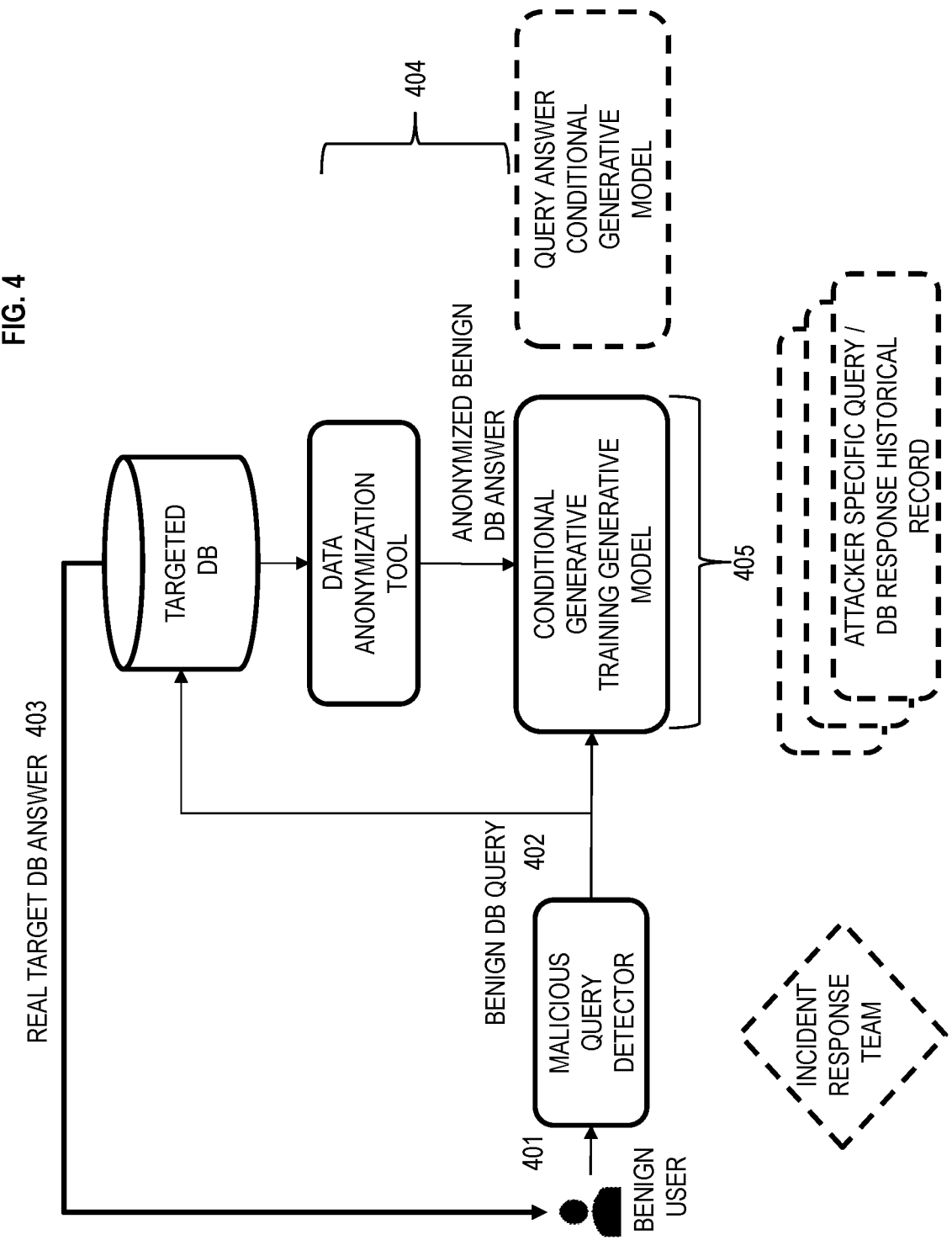
FIG. 4 depicts a block diagram of an architectural example using benign users to train a generative model in accordance with one or more embodiments of the present invention.

FIG. 3 is a flowchart of a computer-implemented process 300 for defense of targeted database attacks through dynamic honeypot database response generation in accordance with one or more embodiments of the present invention. Particularly, FIG. 3 incorporates a training process for a generative model 244 as discussed herein. FIG. 4 depicts a block diagram of an architectural example using benign users to train generative model 244 according to one or more embodiments of the invention. The computer-implemented process 300 in FIG. 3 can be implemented using the system 200 shown in FIG. 2 and/or the computer architecture shown in FIG. 4. Accordingly, the computer-implemented process 300 will now be described with reference to the system 200 shown in FIG. 2 and the computer architecture shown in FIG. 4.

At block 302, software applications 204 on computer system 202 are configured to receive a query 230 for a targeted database 208 from computer system 220. Query 230 is a database query intended for targeted database 208. The user can send query 230 from computer system 220. Although targeted database 208 is utilized as an example, query 230 could be for any portion of memory 206 which includes targeted database 208 and/or other memory spaces in memory 206. Computer system 220 is the system for the user. In some example scenarios, the user can be a benign user. In this context, a benign user is one who is interacting with computer system 202 in a normal or authorized way for authorized activities, for example, in accordance with policies and procedures for computer system 202. Computer system 220 can communicate with computer systems 202 over a wired and/or wireless network. Using computer system 220, the user can interface directly with software applications 204 of computer system 202 and/or use a client application 222 to interface with software applications 204. Software applications 204 can be implemented as software 111 executed on one or more processors 101, as discussed in FIG. 1. Similarly, client application 222 can be implemented using software 111 configured to execute on one or more processors 101. Client application 222 can include cookies, plug-ins, thin clients, etc., and client application 222 can serve as a piece of computer software that accesses computer system 202. Query 230 can include credentials and/or credentials may have been previously submitted for query 230. Credentials include, for example, username and password, account numbers, tokens, physical characteristics of a person, etc. Targeted database 208 can be representative of numerous databases. Targeted database 208 can contain hundreds, thousands, and/or millions of documents, also referred to as "big data". In accordance with one or more embodiments, the enormous size of targeted database 208 requires management, processing, and search by a machine (such as computer system 202), for example, using computer-executable instructions, and targeted database 208 could not be practically managed, stored, analyzed, and/or processed as discussed herein within the human mind.

Referring to FIG. 3, at block 304, software applications 204 are configured to detect whether query 230 is malicious or benign. In FIG. 3, query 230 is determined to be benign, and accordingly, the user is referred to as a benign user. Software applications 204 can use any suitable technique to determine whether a query is benign or malicious. For example, software applications 204 can include, be integrated with, and/or employ one or more malicious query detectors 240. FIG. 4 shows flow 401 from the user to malicious query detector and flow 402 shows the benign query being sent to the targeted database and generative model 244 for training. The dashed boxes are not in use FIG. 6. Malicious query detectors 240 can include software executed on one or more processors 101 and/or can include application specific integrated circuits (ASIC). Malicious query detectors can include various intrusion algorithms. Malicious query detectors 240 can use clustering algorithms, outlier algorithms, and others to detect and distinguish malicious queries from benign queries. Malicious query detectors 240 can be configured to detect attempts to inject commands into database systems or try to otherwise trigger transactions to gain unprivileged access to records in database systems. Malicious query detectors 240 can used match network traffic (i.e., queries) against a list of known attack patterns including use of a rules-based engine for employing pattern-based rules. Malicious query detectors 240 can employ anomaly-based methods for detecting web-based intrusions including analyzing log-files or protocol-level information to detect anomalies based on heuristics or data-mining techniques. Malicious query detectors 240 can include other analysis techniques including tree-kernel based learning as part of natural language processing (NLP). In one or more embodiments, a machine learning model can be utilized for detecting malicious queries. One or more embodiments may not utilize machine learning for malicious query detectors. One or more embodiments could make use of any intrusion detection system capable of detecting the presence of an attacker or attack on a targeted database or the presence of an attacker or an attack on the network/environment where the database is hosted. In other words, the attacker may not have interacted with the database yet, but they have been recognized as malicious based on actions performed on other systems, and therefore the system already knows they are malicious by the time they start interacting with the system.

Referring to FIG. 3, at block 306, software applications 204 on computer systems 202 are configured to generate a response 232 from targeted database 208 and return the response 232 to computer system 220. Response 232 can also be referred to as a database response. FIG. 4 depicts an illustration of the benign database response returned to the benign user as well of generative model 244 for training at flows 403 and 404. Using software applications 204, targeted database 208 can generate response 232. In one or more embodiments, the query can be interpreted or used as a structured query language (SQL) statement which solicits a result (i.e., response) from the targeted database. SQL is a standard language for storing, manipulating, and retrieving data in databases.

As part of training generative model 244, at block 308, software applications 204 are configured to anonymize response 232 to query 230 for the benign user. Software applications 204 can include, be integrated with, and/or employ one or more data anonymization modules 242. Data anonymization modules 242 can include software application executed on one or more processors 101 and/or application specific integrated circuits. Data anonymization is a type of information sanitization whose intent is privacy protection, as depicted generally in flow 404 in FIG. 4. It is the process of removing personally identifiable information from datasets, so that the people for whom the data describe remain anonymous and the data itself is not genuine or real. Data anonymization modules 242 can use various masking techniques to replace data in response 232 with different values, while preserving the format and structure of the genuine data (i.e., original data) from targeted database 208.

As part of the training generative model 244, at block 310, software applications 204 are configured to transfer query 230 and its corresponding anonymized response to generative model 244 for training, as generally depicted in flows 402 and 404 in FIG. 4. At block 312, software applications 204 are configured to repeat this process 300 for each benign query to build a dataset of queries and their associated anonymized response for generative model 244, as generally depicted at flow 405 in FIG. 4. Generative model 244 can be a generative adversarial network (GAN) which is a class of machine learning frameworks. Given a training set, generative model learns to generate new data with the same statistics as the training set. The training set includes benign queries and their corresponding anonymized responses from targeted databases 208. Example algorithms that can be used for the generative model include but are not limited to Gaussian mixture model (and other types of mixture model), Hidden Markov model, probabilistic context-free grammar, Bayesian network (e.g., Naive Bayes, autoregressive model, etc.), averaged one-dependence estimators, latent Dirichlet allocation, variational autoencoder, generative adversarial network, flow-based generative model, etc. With respect to a conditional GAN, the GAN can use unsupervised learning, semi-supervised learning, fully supervised learning, and reinforcement learning. In one or more embodiments, GAN can include "indirect" training through a discriminator, which itself is could be updated dynamically. The generator can be trained to fool the discriminator. This enables the GAN model to learn in an unsupervised manner. The generative network generates candidates while the discriminative network evaluates them. The contest operates in terms of data distributions. The generative network learns to map from a latent space to a data distribution of interest, while the discriminative network distinguishes candidates produced by the generator from the true data distribution. The generative network's training objective is to increase the error rate of the discriminative network (i.e., "fool" the discriminator network by producing novel candidates that the discriminator thinks are not synthesized (are part of the true data distribution)). A known dataset serves as the initial training data for the discriminator. Training the GAN involves presenting it with samples from the training dataset (e.g., benign queries and their corresponding anonymized responses from targeted databases 208), until the GAN achieves acceptable accuracy. The generator trains based on whether it succeeds in fooling the discriminator. Thereafter, candidates synthesized by the generator are evaluated by the discriminator. The generator is typically a deconvolutional neural network, and the discriminator is generally a convolutional neural network. Although one or more embodiments discuss the generation of honeypot database responses through the use of a conditional GAN model, it should be appreciated that one or more embodiments may not use a conditional GAN and could employ any mechanism capable of producing a honeypot database response containing realistic synthetic data.

Figure 5:
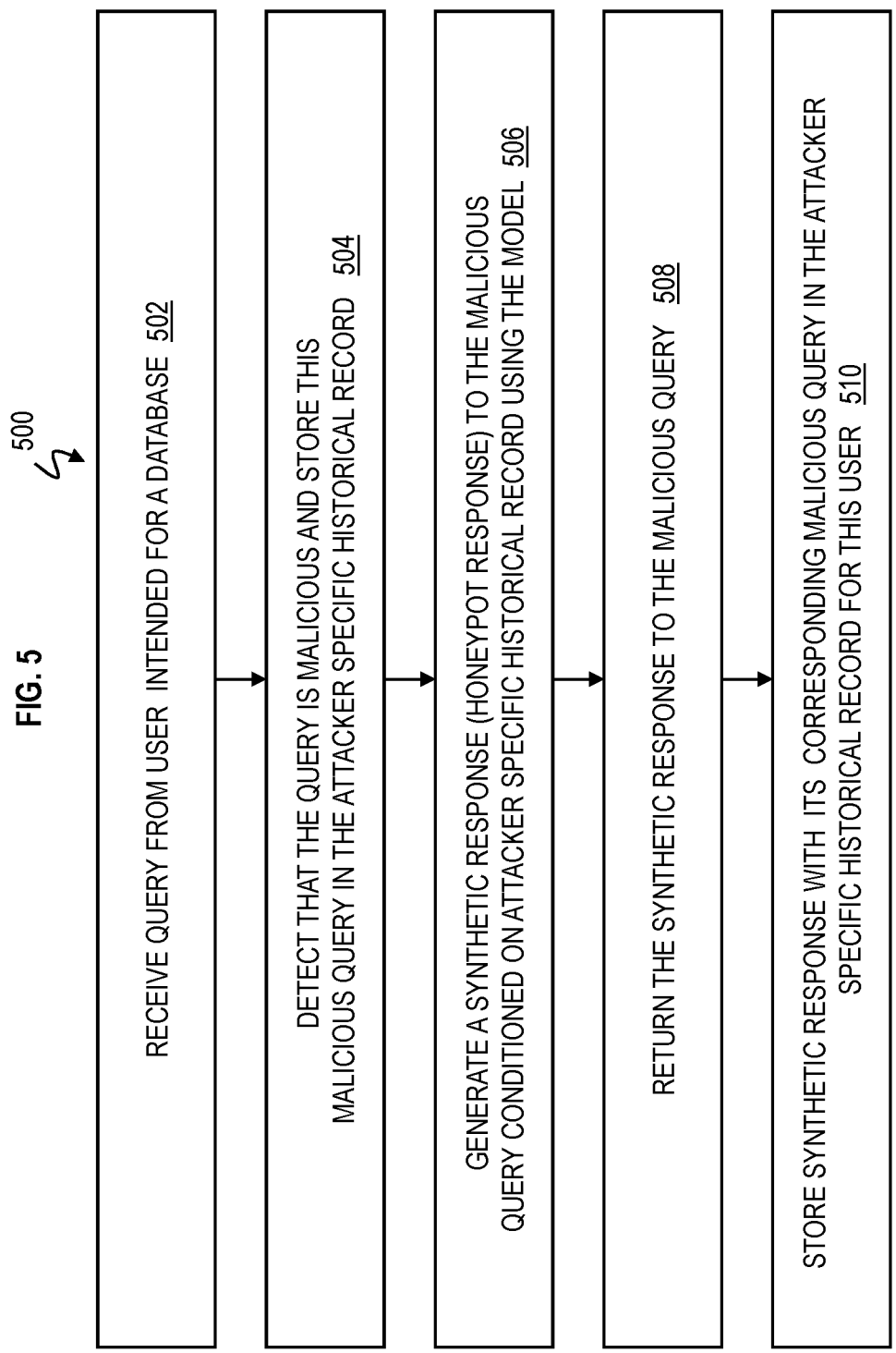
FIG. 5 depicts a flowchart of a computer-implemented process for defense of targeted database attacks through dynamic honeypot database response generation in accordance with one or more embodiments of the present invention.
Figure 6:
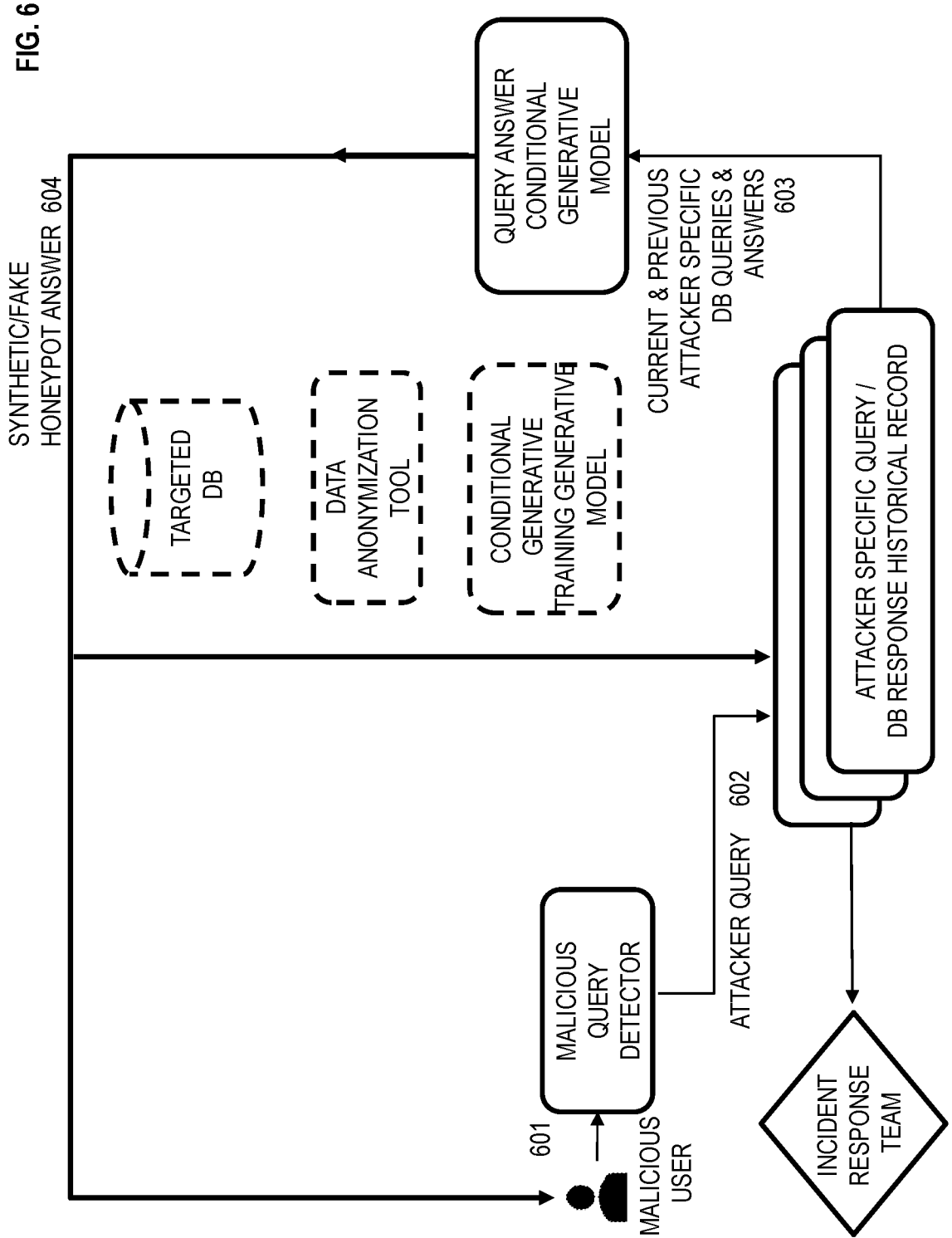
FIG. 6 depicts a block diagram of an architectural example of a malicious user attempting to gain access to a targeted database and use of dynamic honeypot database response generation to thwart the attack in accordance with one or more embodiments of the present invention.

FIG. 5 is a flowchart of a computer-implemented process 500 for defense of targeted database attacks through dynamic honeypot database response generation in accordance with one or more embodiments of the present invention. The computer-implemented process 500 in FIG. 5 can be implemented using the system 200 shown in FIG. 2. Particularly, generative model 244 has been trained to receive a query (including malicious queries) and provide a synthetic response which is a fake response based on the previous history of the attacker. Malicious user, attacker, unauthorized user, etc., can be used interchangeably. FIG. 6 depicts a block diagram of an architectural example of a malicious user attempting to gain access to a targeted database and use of dynamic honeypot database response generation to thwart the attack according to one or more embodiments of the invention. The dashed boxes represent functions not used in FIG. 6. Process 500 in FIG. 5 will be described with reference to FIGS. 2 and 6. At block 502, software applications 204 on computer system 202 are configured to receive a query 230 intended for targeted database 208 from computer system 220. Again, the user can send query 230 from computer system 220.

Referring to FIG. 5, at block 504, software applications 204 are configured to detect that query 230 is malicious. FIG. 6 shows flow 601 from the user to malicious query detector, while flow 602 illustrates detection of the malicious query. In FIG. 5, query 230 is determined to be malicious and/or unauthorized, and accordingly, the user and query are designated by software applications 204 as a malicious user and processed accordingly. Upon detecting that query 230 is malicious, software applications 204 are configured to store this malicious query in an attacker specific query and response historical record 246 for this user having been designated as an attacker. Attacker specific query and response historical record 246 is a system (e.g., database system) that stores a log of database queries and corresponding responses for a specific attacker (i.e., user). Such database responses can include both targeted database responses and/or synthetic responses (i.e., honeypot responses which are fake). Moreover, attacker specific query and response historical record 246 includes pre-attacker detection queries that were initially perceived as benign along with their corresponding real target database response (e.g., as in FIGS. 3 and 4). Likewise, attacker specific query and response historical record 246 includes post attacker detection queries along with their corresponding synthetic database responses (i.e., honeypot responses). In one or more embodiments, malicious query detector 240 can have a threshold which has to be met before a user is classified as malicious. Initially, a user can interact with computer system 202 in an unauthorized manner and gradually increase toward unauthorized activities (e.g., queries), all of which is monitored by software applications 204. A malicious user is one who is interacting with computer system 202 in an abnormal or unauthorized manner, for example, which is not in accordance with policies and procedures for computer system 202. Once a user has been designated as malicious or unauthorized by software applications 204 (e.g., met the threshold of malicious query detector 240), all past history and current history of that user is stored in attacker specific query and response historical record 246 for reference as discussed herein. As noted above, query 230 can include credentials and/or credentials may have been previously submitted for query 230, where the credentials identify the user. These credentials can be utilized to track the user's past and current interactions with the computer system 202. In addition to user credentials for identifying and tracking the user, the user can be identified and tracked by his associated tokens, internet protocol (IP) address, etc., which are all stored for the user in attacker specific query and response historical record 246. Mapping 248 can be a table that includes all user information including credentials associated with a user, along with aliases, such that all user information for a user can be mapped back to that user. Software applications 204 can consult mapping 248 when creating, updating, and accessing attacker specific query and response historical record 246 for the user.

Referring to FIG. 5, at block 506, using previously trained generative model 244, software applications 204 on computer systems 202 are configured to generate a response 232 (without accessing targeted database 208) to the malicious query conditioned on (i.e., in accordance with) the attacker specific query and response historical record 246 for this specific malicious user. In this case, response 232 is a synthetic response also referred to as a honeypot response, and the synthetic response is a fake response that does not contain the sensitive data contained in targeted database 208. FIG. 6 shows flow 603 of attacker specific query and response historical information being provided to the generative model.

When generating the synthetic response, the synthetic responses (i.e., honeypot database responses) are produced in such a fashion that the malicious user will receive responses that are consistent with any query previously submitted by that user. For example, a malicious user previously submitted (which could have been a benign user when submitted) the following query: "count * from table A". The previous answer received for that query was "4". Any future query submitted by this malicious user will receive a response in which the total number of rows present in "table A" could only be equal or smaller than 4, in accordance with the attacker specific query and response historical record 246 for this user. By keeping the responses consistent with respect to all previous queries and responses for this user, software applications 204 guarantee that the malicious user is unaware that he/she is been provided with synthetic data (i.e., honeypot data) as opposed to the real targeted data of targeted database 208. As another example, if the malicious user previously submitted a query to erase all data in rows 1-10, then any future query submitted by this malicious user regarding rows 1-10 will receive a response indicating that rows 1-10 are empty, in accordance with the attacker specific query and response historical record 246 for this user. Software applications 204 are configured to concurrently (e.g., in real-time and/or near real-time) generate and provide different malicious users each with a (unique) synthetic response specific to previous queries respectively submitted by the users, thereby being able to defend against simultaneous attackers.

Referring to FIG. 5, at block 508, software applications 204 on computer systems 202 are configured to return response 232 (i.e., synthetic response) to the malicious query and store the synthetic response with its corresponding malicious query in attacker specific query and response historical record 246 for this malicious user at block 510. In one or more embodiments, anonymization module 242 could be utilized to anonymize data in the synthetic response as a further precaution prior to returning to the malicious user. FIG. 6 shows flow 604 of the synthetic response back to the malicious user and to the attacker specific query and response historical record specific to the malicious user, in preparation for future queries. The Incident Response Team on computer system 224 can gather data related to the attack.

In accordance with or more embodiments of the invention, technical advantages and benefits include a system and method which can protect databases containing personal information from attackers. The system does not require the creation of any honeypot database itself, but instead uses only a minimum configuration effort. The system can further delay the attacker from discovering it has been detected, and thus provides leverage to the attacked system to safely monitor the attacker's behaviour while the attacker is kept busy with fake database responses. The usage of a generative model provides an unlimited number of attacker specific honeypots database responses (i.e., synthetic responses). Should an attacker disclose the synthetic dataset to the public, the technique enables investigators to link the published synthetic dataset to the specific honeypot database system that generated it, and thus to a specific attacker. The usage of the generative model also enables the system to produce an endless amount of data (uniquely) for each attacker to keep him busy. The system can provide the Incident Response Team with forensic records on how the attack was performed and what information within the database was specifically targeted.

Figure 7:
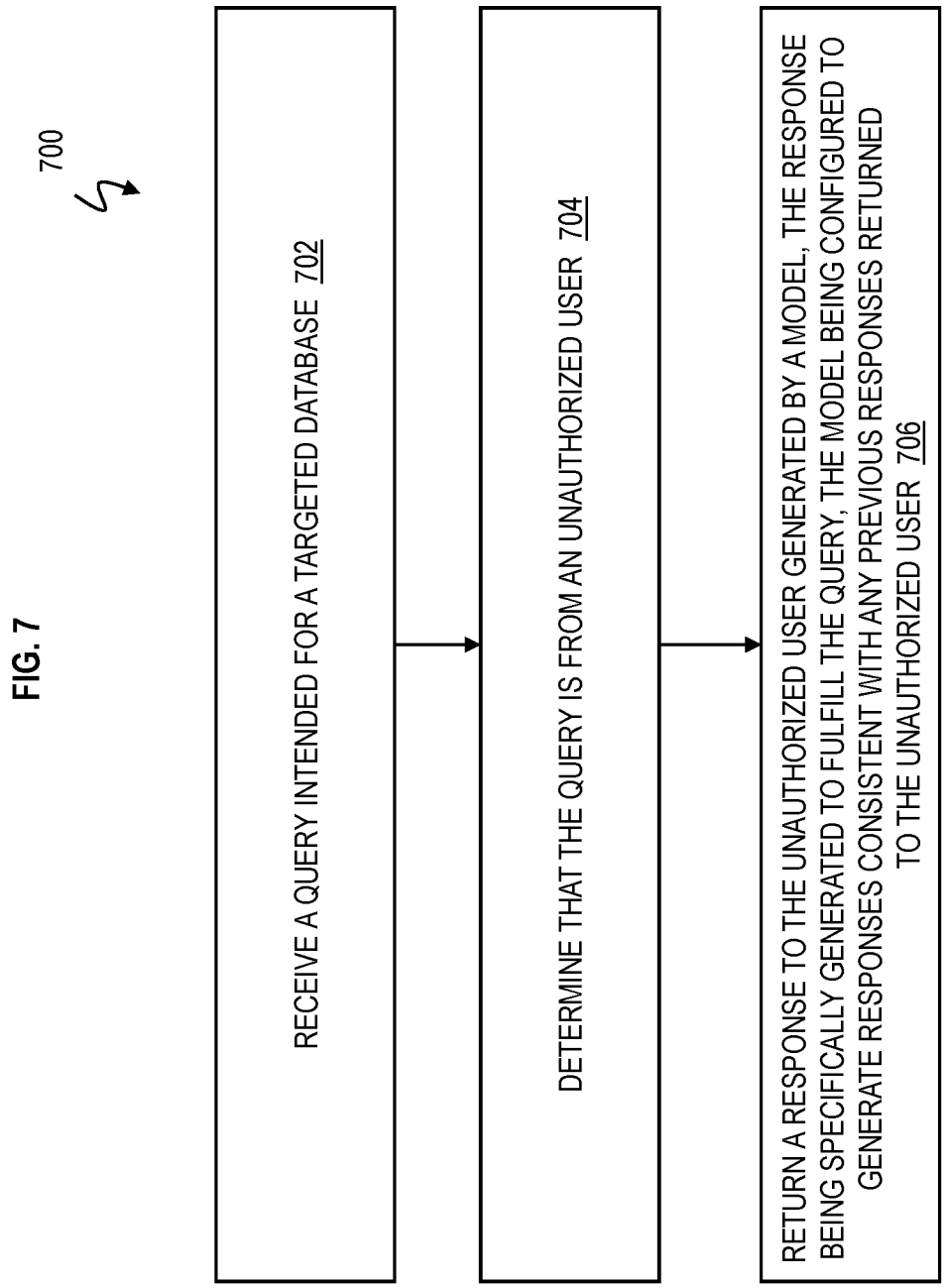
FIG. 7 depicts a flowchart of a computer-implemented method for defending against targeted database attacks through dynamic honeypot database response generation in accordance with one or more embodiments of the present invention.

FIG. 7 depicts a flowchart of a computer-implemented method 700 for defending against targeted database attacks through dynamic honeypot database response generation in accordance with one or more embodiments of the invention. The computer-implemented method 700 in FIG. 7 can be implemented using the system 200 shown in FIG. 2. At block 702, software applications 204 of computer system 202 are configured to receive a query 230 (e.g., malicious query) intended for a targeted database 208. At block 704, software applications 204 of computer system 202 are configured to determine that the query 230 is from an unauthorized user (e.g., malicious query from a malicious user). At block 706, software applications 204 of computer system 202 are configured to return a response 232 (e.g., synthetic response which is a honeypot response) to the unauthorized user generated by a model (e.g., generative model 244), the response 232 being specifically and dynamically (in real-time and/or near real-time) generated to fulfill the query 230, the model (e.g., generative model 244) being configured to generate responses consistent with any previous responses returned to the unauthorized user (e.g., generate synthetic responses (via generative model 244) consistent previous responses and queries in attacker specific query and response historical record 246).

The model (e.g., generative model 244) is configured to synthesize data in the synthetic response in a structure and format that is consistent with data in a genuine response from the targeted database 208. For example, if the query requests account information and if targeted database 208 would normally provide account information as a nine-digit number, the generative model 244 is configured to likewise provide a synthetic response with a nine-digit number. A genuine response is a response that contains data sourced from and stored in targeted database 208. In contrast, the synthetic response generated by generative model 244 and does not contain data sourced from and stored in targeted database 208. The model is configured to access a historical record (e.g., attacker specific query and response historical record 246), the historical record comprising any previous queries associated with the unauthorized user and the any previous responses returned to the unauthorized user. Generate the responses consistent with the any previous responses returned to the unauthorized user comprises ensuring that data generated in the synthetic response is not in conflict with previous data of the any previous responses for that same user. The response to the unauthorized user is generated by the model based on any previous queries received from the unauthorized user. The query and the response returned are stored in a historical record (e.g., attacker specific query and response historical record 246) associated with the unauthorized user. The targeted database 208 contains sensitive information, the model being configured to generate data excluding the sensitive information. In one or more embodiments, software applications 204 can anonymization module 242 to anonymize the synthetic response to eliminate any potential or accident of the generative model 244 creating a synthetic response (i.e., honeypot response) with sensitive information in targeted database 208.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
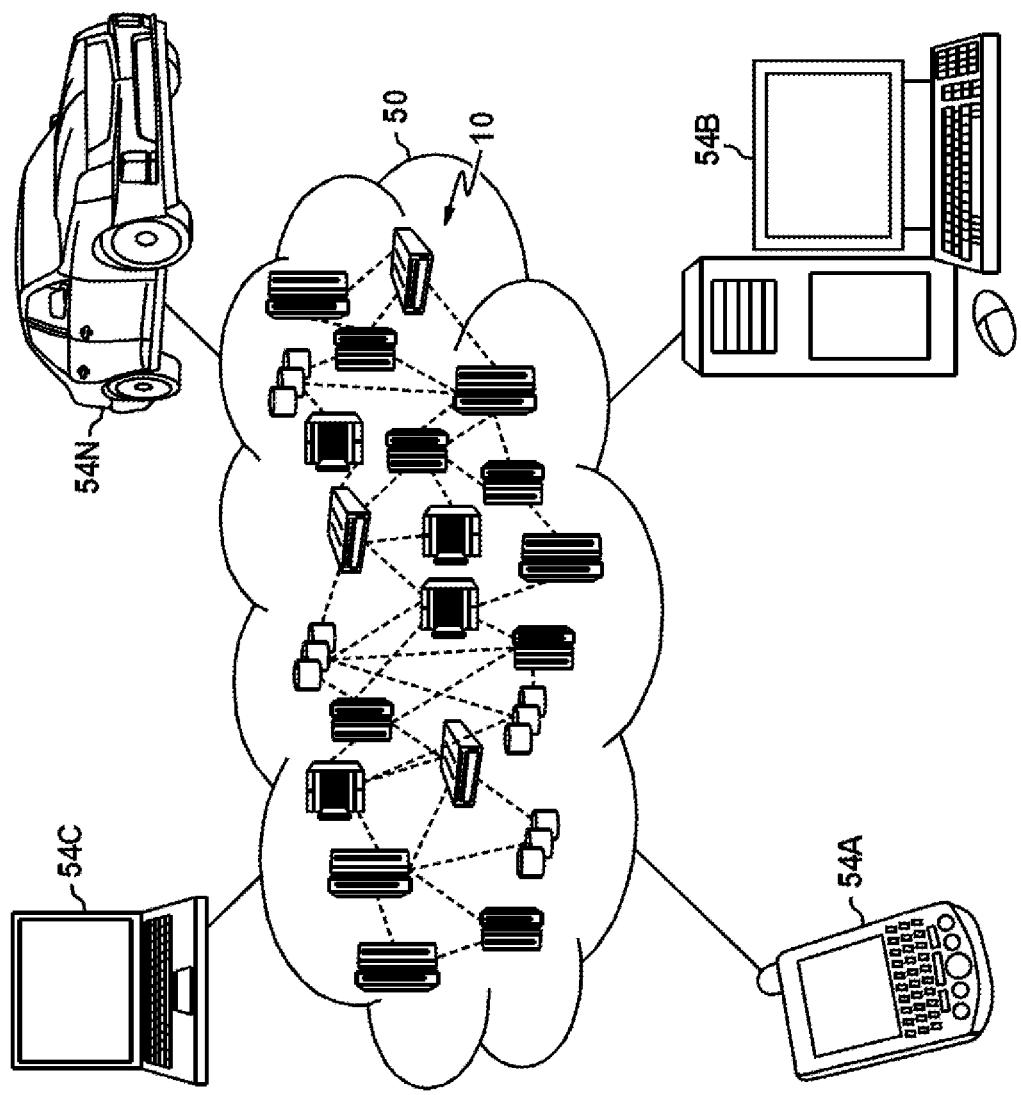
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
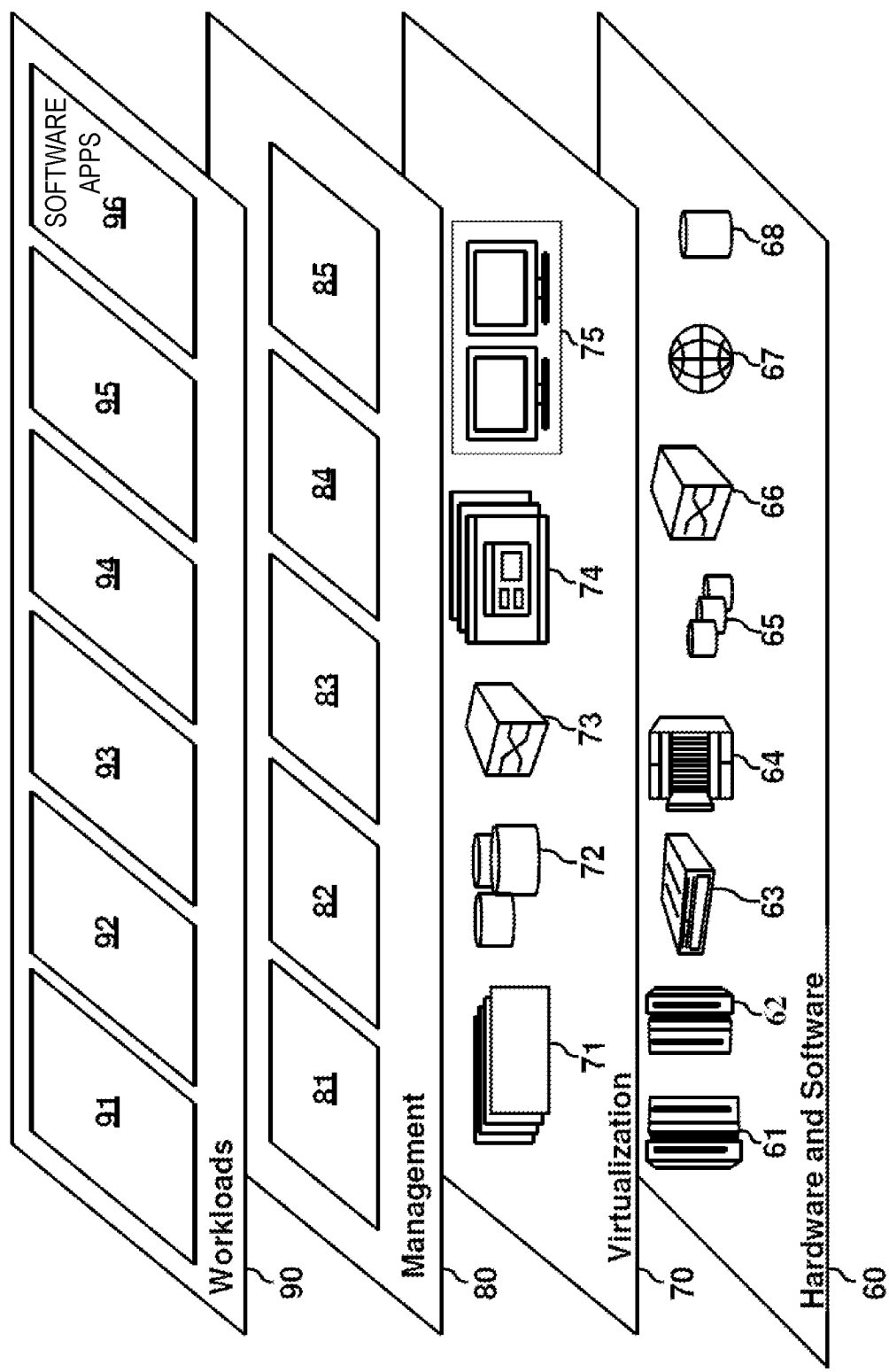
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204, malicious query detector 240, anonymization module 242, generative model 244, etc.) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a computer system, a query intended for a targeted database;
determining, by the computer system, that the query is from an unauthorized user in order to protect the targeted database;
returning, by the computer system, a response, to the unauthorized user, generated by a model without accessing the targeted database, the response being dynamically generated to fulfill the query, the model being a generative model that generates responses consistent with any previous responses returned to the unauthorized user, the generative model having been trained on data to and from the targeted database that is being protected, wherein the data comprises a plurality of queries for the targeted database and respective anonymized responses from the targeted database, personally identifiable information having been removed from the respective anonymized responses, wherein the generative model generates synthesized data in the response in a format that is consistent with the data in a genuine response from the targeted database, wherein the generative model is trained to generate the synthesized data that causes an error in a neural network, the neural network being trained to discriminate between the data from the targeted database and the synthesized data; and
in response to determining that the query is from an unauthorized user, storing the query and the response in a historical record specific to the unauthorized user, the historical record comprising previous queries associated with the unauthorized user and the any previous responses returned to the unauthorized user, the historical record further comprising pre-attacker detection queries that were initially perceived as benign along with real target database responses to the pre-attacker detection queries.

2. The computer-implemented method of claim 1, wherein generate the responses consistent with the any previous responses returned to the unauthorized user comprises ensuring that data generated in the response is not in conflict with previous data of the any previous responses.

3. The computer-implemented method of claim 1, wherein the response to the unauthorized user is generated by the model based on the previous queries received from the unauthorized user.

4. The computer-implemented method of claim 1, wherein the targeted database contains sensitive information further comprising generating, by the generative model, synthesized data excluding the sensitive information.

5. A system comprising:
   a memory having computer readable instructions; and
   one or more processors for executing the computer readable instructions, the computer readable instructions controlling the one or more processors to perform operations comprising:
   receiving a query intended for a targeted database;
   determining that the query is from an unauthorized user in order to protect the targeted database;
   returning a response, to the unauthorized user, generated by a model without accessing the targeted database, the response being dynamically generated to fulfill the query, the model being a generative model that generates responses consistent with any previous responses returned to the unauthorized user, the generative model having been trained on data to and from the targeted database that is being protected, wherein the data comprises a plurality of queries for the targeted database and respective anonymized responses from the targeted database, personally identifiable information having been removed from the respective anonymized responses, wherein the generative model generates synthesized data in the response in a format that is consistent with the data in a genuine response from the targeted database, wherein the generative model is trained to generate the synthesized data that causes an error in a neural network, the neural network being trained to discriminate between the data from the targeted database and the synthesized data; and
   in response to determining that the query is from an unauthorized user, storing the query and the response in a historical record specific to the unauthorized user, the historical record comprising previous queries associated with the unauthorized user and the any previous responses returned to the unauthorized user, the historical record further comprising pre-attacker detection queries that were initially perceived as benign along with real target database responses to the pre-attacker detection queries.

6. The system of claim 5, wherein generate the responses consistent with the any previous responses returned to the unauthorized user comprises ensuring that data generated in the response is not in conflict with previous data of the any previous responses.

7. The system of claim 5, wherein the response to the unauthorized user is generated by the model based on any previous queries received from the unauthorized user.

8. The system of claim 5, wherein the targeted database contains sensitive information, the model being configured to generate data excluding the sensitive information.

9. A computer program product comprising a computer-readable storage device having program instructions embodied therewith, the program instructions executable by a processor to cause the processor to perform operations comprising:
   receiving a query intended for a targeted database;
   determining that the query is from an unauthorized user in order to protect the targeted database;
   returning a response, to the unauthorized user, generated by a model without accessing the targeted database, the response being dynamically generated to fulfill the query, the model being a generative model that generates responses consistent with any previous responses returned to the unauthorized user, the generative model having been trained on data to and from the targeted database that is being protected, wherein the data comprises a plurality of queries for the targeted database and respective anonymized responses from the targeted database, personally identifiable information having been removed from the respective anonymized responses, wherein the generative model generates synthesized data in the response in a format that is consistent with the data in a genuine response from the targeted database, wherein the generative model is trained to generate the synthesized data that causes an error in a neural network, the neural network being trained to discriminate between the data from the targeted database and the synthesized data; and
   in response to determining that the query is from an unauthorized user, storing the query and the response in a historical record specific to the unauthorized user, the historical record comprising previous queries associated with the unauthorized user and the any previous responses returned to the unauthorized user, the historical record further comprising pre-attacker detection queries that were initially perceived as benign along with real target database responses to the pre-attacker detection queries.

10. The computer program product of claim 9, wherein the model is configured to synthesize data in the response in a format that is consistent with data in a genuine response from the targeted database.

11. The computer program product of claim 9, wherein generate the responses consistent with the any previous responses returned to the unauthorized user comprises ensuring that data generated in the response is not in conflict with previous data of the any previous responses.

12. The computer program product of claim 9, wherein the response to the unauthorized user is generated by the model based on any previous queries received from the unauthorized user.

* * * * *